United States Patent
Perry et al.

(10) Patent No.: US 9,403,301 B2
(45) Date of Patent: Aug. 2, 2016

(54) METHOD FOR PROCESSING A POROUS ARTICLE

(75) Inventors: Michael L. Perry, Glastonbury, CT (US); Paravastu Badrinarayanan, Manchester, CT (US); Glenn Michael Allen, Vernon, CT (US); Steven W. Gronda, Feeding Hills, MA (US)

(73) Assignee: Audi AG, Ingolstadt (DE)

( * ) Notice: Subject to any disclaimer, the term of this patent is extended or adjusted under 35 U.S.C. 154(b) by 1178 days.

(21) Appl. No.: 13/395,746

(22) PCT Filed: Nov. 23, 2009

(86) PCT No.: PCT/US2009/065459
§ 371 (c)(1),
(2), (4) Date: Mar. 13, 2012

(87) PCT Pub. No.: WO2011/062593
PCT Pub. Date: May 26, 2011

(65) Prior Publication Data
US 2012/0168975 A1    Jul. 5, 2012

(51) Int. Cl.
*B29C 43/52* (2006.01)
*B29C 43/02* (2006.01)
(Continued)

(52) U.S. Cl.
CPC ........... *B29C 43/021* (2013.01); *H01M 8/0234* (2013.01); *H01M 8/0243* (2013.01); *H01M 8/04126* (2013.01); *H01M 8/04156* (2013.01);
(Continued)

(58) Field of Classification Search
CPC ...... B29C 43/52; B29C 43/021; B29C 43/02; B29C 43/14; B29C 43/32; B29C 33/04
USPC ................................................ 264/104, 29.6
See application file for complete search history.

(56) References Cited

U.S. PATENT DOCUMENTS 4,175,165 A * 11/1979 Adlhart ................. H01M 4/926
29/623.1
4,360,485 A    11/1982 Emanuelson et al.
(Continued)

FOREIGN PATENT DOCUMENTS

EP    2015384    1/2009
JP    04-214072    8/1992
(Continued)

OTHER PUBLICATIONS

Search Report and Written Opinion for PCT/US2009/065459 mailed on Nov. 23, 2009.

*Primary Examiner* — Christina Johnson
*Assistant Examiner* — Xue Liu
(74) *Attorney, Agent, or Firm* — Seed IP Law Group PLLC

(57) ABSTRACT

A method of processing a porous article includes distributing a blended material that includes an electrically conductive material and a binder into a cavity of a mold that is at a temperature below a curing temperature of the binder. The electrically conductive material is formed from particles of the electrically conductive material that have a size distribution such that 10 vol % of the particles are less than 12 micrometers in diameter, 50 vol % of the particles are less than 27 micrometers in diameter, and 90 vol % of the particles are less than 53 micrometers. The blended material is compressed within the cavity under a molding pressure, and the mold is heated to a curing temperature of the binder to form a molded article.

19 Claims, 2 Drawing Sheets

(51) Int. Cl.
  *H01M 8/02* (2016.01)
  *H01M 8/04* (2016.01)
  *B29C 33/04* (2006.01)

(52) U.S. Cl.
  CPC .............. *B29C 33/04* (2013.01); *B29C 43/52* (2013.01); *Y02E 60/50* (2013.01)

(56) References Cited

U.S. PATENT DOCUMENTS

| | | | |
|---|---|---|---|
| 4,374,906 | A | 2/1983 | Breault et al. |
| 4,426,340 | A | 1/1984 | Goller et al. |
| 4,670,300 | A | 6/1987 | Stewart, Jr. |
| 4,851,304 | A | 7/1989 | Miwa et al. |
| 4,938,942 | A | 7/1990 | Gorman et al. |
| 5,300,124 | A | 4/1994 | Breault et al. |
| 5,503,944 | A | 4/1996 | Meyer et al. |
| 6,197,442 | B1 | 3/2001 | Gorman |
| 6,248,467 | B1 | 6/2001 | Wilson et al. |
| 6,297,442 | B1 | 10/2001 | Yagi et al. |
| 6,764,624 | B2 | 7/2004 | Saito et al. |
| 7,029,783 | B1 | 4/2006 | Otawa et al. |
| 7,442,329 | B2 * | 10/2008 | Yoshida .................. C08G 8/10 252/511 |
| 7,544,630 | B2 | 6/2009 | Hatoh et al. |
| 2002/0027305 | A1 * | 3/2002 | Kibi ....................... H01G 9/155 264/29.6 |
| 2003/0104257 | A1 | 6/2003 | Chervinko et al. |
| 2003/0148164 | A1 | 8/2003 | Koch et al. |
| 2004/0227265 | A1 | 11/2004 | Nishida et al. |
| 2005/0252603 | A1 | 11/2005 | Rule |
| 2006/0234108 | A1 | 10/2006 | Tsushima |
| 2006/0267235 | A1 | 11/2006 | Ma et al. |
| 2009/0286131 | A1 | 11/2009 | Taniguchi |

FOREIGN PATENT DOCUMENTS

| | | |
|---|---|---|
| JP | 2001052721 | 2/2001 |
| WO | 2008051219 | 5/2008 |

\* cited by examiner

METHOD FOR PROCESSING A POROUS ARTICLE

BACKGROUND

This disclosure relates to techniques for forming porous articles, such as porous water transport plates for fuel cells. The processing techniques that are used to form porous articles can have a significant influence on the properties and performance characteristics of the article. As an example, a porous water transport plate may be molded from a granular material. The size of the granules may influence the mechanical properties, pore size, and electrical properties of the plate. Therefore, the granule size used in the molding of the plate ultimately plays a role in controlling the performance of the fuel cell. Although the factor of granule size is known, new processing techniques must be developed that enable greater control over the properties of porous articles and performance of the final products.

SUMMARY OF THE DISCLOSURE

An exemplary method of processing a porous article includes distributing a blended material that includes an electrically conductive material and a binder into a cavity of a mold that is at a temperature below a curing temperature of the binder. The electrically conductive material is formed from particles of the electrically conductive material that have a size distribution such that 10 vol % of the particles are less than 12 micrometers in diameter, 50 vol % of the particles are less than 27 micrometers in diameter, and 90 vol % of the particles are less than 53 micrometers. The blended material is compressed within the cavity under a molding pressure, and the mold is heated to a curing temperature of the binder to form a molded article.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
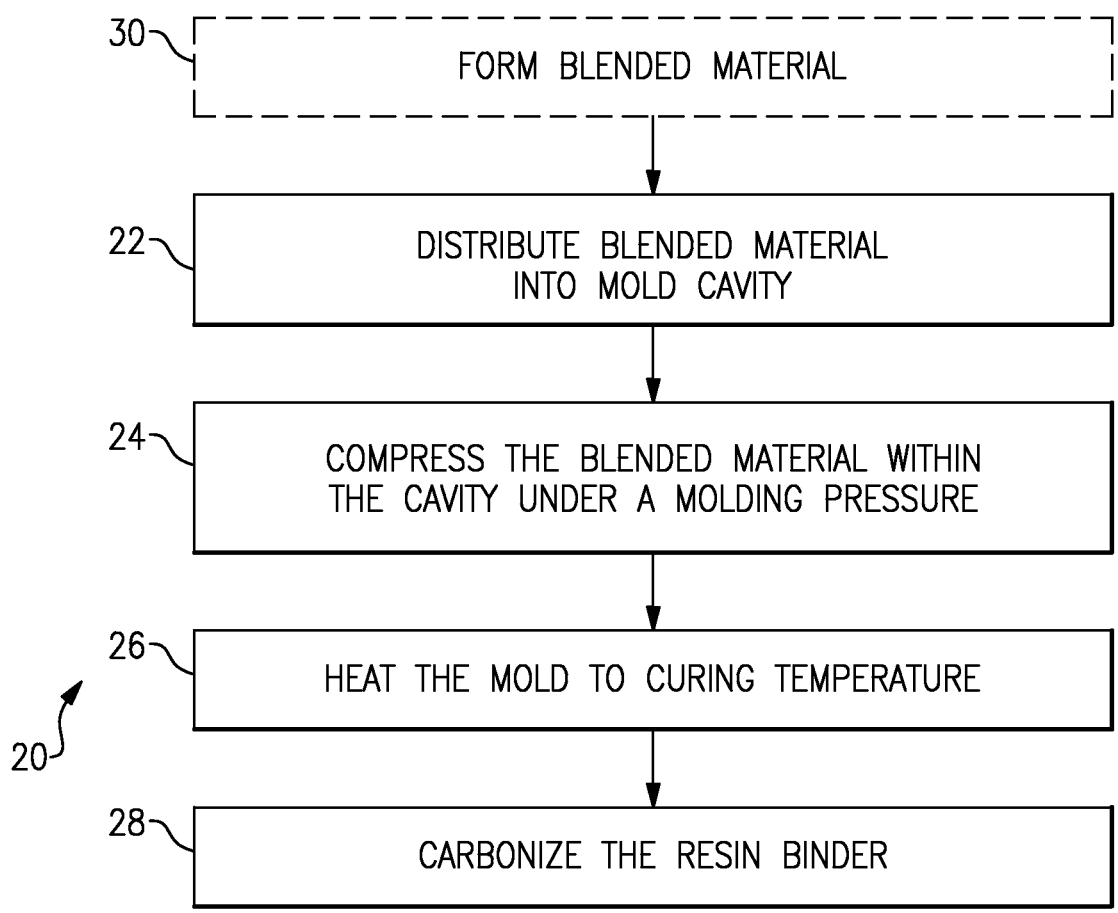
FIG. 1 illustrates an example method for processing a porous article.

FIG. 1 illustrates selected steps of an example method 20 for processing a porous article. As will be appreciated, the method 20 maybe used to form any desirable type of porous article, such as a porous water transport plate for a fuel cell.

In the illustrated example, the method 20 includes a distribution step 22, a compression step 24, a heating step 26, and a carbonizing step 28, which will each be described in more detail below. Optionally, the method 20 may also include a formation step 30 for forming a blended material that will be used in the method 20 to mold the porous article.

As will be appreciated from the following description of the steps of the method 20, the example combination of the steps facilitates controlling forming of the porous article to achieve desirable mechanical and physical properties. As an example, the method 20 may be used to control mechanical strength, electrical conductivity, and pore size distribution of the porous article to achieve desirable performance properties in the article or final product.

Turning now to the distribution step 22 of the method 20, the blended material is distributed into a cavity of a mold that will be used to form the porous article. As can be appreciated, the cavity may be formed with the shape desired for the final porous article and is not limited to any particular shape. The blended material may include relatively small particles having a composition that is desirable for the final porous article. In one example, the blended material includes an electrically conductive material and a binder such as a resin. The examples herein may refer to resin binder, but it is to be understood that other types of binders may be used. The electrically conductive material may be graphite, and the resin binder may be a thermosetting polymer. As a further example, the electrically conductive material and resin binder may be as described in co-owned U.S. Pat. No. 6,297,442 entitled "Method of Using a Water Transport Plate." In some examples, the blended material may additionally include other substances to facilitate one or more of the steps of the method 20, such as a surfactant or performance additives. In other examples, the blended material may include only the electrically conductive material and the resin binder without the purposeful addition of any other materials or substances. In this case, the blended material may include trace amounts of impurities that do not materially influence the processing or properties of the porous article.

The blended material is uniformly distributed into the mold cavity. As an example, a charge of the blended material having a predetermined weight and/or volume may be provided into the mold cavity and then leveled to provide a uniform distribution of the blended material throughout the cavity. As an example, a doctor blade or similar mechanism may be used to "level off" the blended material and thereby spread the material evenly throughout the cavity. Optionally, the mold cavity may be agitated to facilitate uniformly distributing the material.

Initially, the mold is maintained at a cool temperature relative to a curing temperature of the resin binder. One premise of this disclosure is that distributing or loading the blended material into the relatively cool temperature mold allows the blended material to be manipulated within the cavity to achieve a more uniform distribution of the material without curing the resin binder, which would otherwise limit manipulation. The uniform distribution facilitates providing a more uniform pore size distribution in the final porous article. In comparison, loading the blended material into a hot mold at or near the curing temperature would initiate the curing process such that some of the particles adhere together and thereby hinder manipulation. Likewise, cold temperature pressing the blended material into a pre-form for loading into the hot mold would adhere the blended material together and thereby prevent manipulation.

The selected cool temperature may vary depending upon the type of resin binder that is used. In some examples, the selected temperature may be ambient. In other examples, the temperature may be a temperature below which the resin binder softens, flows, or liquefies, such that the blended material does not bond together and inhibit manipulation.

The curing temperature may depend on the type of resin binder that is used. In some examples where the binder is a phenolic resin, the curing temperature may generally be above about 120° C. In this regard, the initial temperature of the mold may be about 100° C. or lower to avoid curing and enable manipulation.

After distribution of the blended material, the mold cavity is closed with a suitable cover or mating mold tool and subjected to a molding pressure, such as 0.5-100 pounds per square inch (approximately 3.5-689 kilopascals), within a press or similar device in the compression step 24. As an example, the mold may be a portable tool that is initially cold for loading of the blended material and then is placed into a heated press for applying a molding pressure. A single molding pressure may be maintained throughout the heating of the mold or, alternatively, the pressure may be adjusted over a pressure profile while heating the mold. While under pressure, the mold is heated in the heating step 26 to the curing temperature of the resin binder to form a molded article. During the heating, the pressure may be increased to 400-800 pounds per square inch (approximately 2758-5516 kilopascals). As an example, the mold may be heated at a predetermined heating rate to gradually heat the blended material. As the temperature increases, the resin binder of the blended material softens and liquefies. The gradual heating allows the softened or liquefied resin to flow under the molding pressure to thereby further facilitate achieving a uniform distribution of the material. If the mold is preheated to the curing temperature, the blended material may heat too rapidly to achieve the necessary resin flow. However, heating at a gradual rate, such as up to about 20° C. per minute, provides the benefit of allowing the softened or liquefied resin to locally flow in the cavity prior to curing. Upon reaching the curing temperature, which may be 130-200° C. for phenolic resins, the molded article may be held for a predetermined amount of time to complete the curing process. The pressure may then be released and the mold cooled before removing the molded article. If no further processing is required the molded article is considered the porous article.

Once cured, the molded article may be further heat treated to carbonize the resin binder in the carbonization step 28 and thereby form a heat treated porous article. The temperature and atmosphere conditions used for the carbonization step 28 may vary depending on the type of resin binder that is selected. In one example where the resin binder is a phenolic resin, the carbonization temperature may be about 900° C. and the treatment atmosphere may be an inert atmosphere (e.g., non-oxidizing). Under such conditions, the resin binder thermally decomposes or "chars" into a carbonaceous material such that the electrically conductive material and the carbonaceous material are bonded together in the shape of the porous article. While a heat treatment step is preferred it may not be required to provide the porous article. The need for the heat treatment step will depend on the starting materials stability in the intended environment of any specific application.

The porous article may be further subjected to post-treatment processing as appropriate for the given article. For instance, if the porous article is a porous water transport plate for use in a fuel cell, the article may be subsequently treated to apply a hydrophilic material to facilitate moisture distribution through the plate. For instance, the hydrophilic material may include tin oxide that is applied using a known wet chemistry acid technique.

The optional step 30 of forming the blended material may additionally facilitate uniform distribution of the blended material throughout the mold cavity and/or contribute to improved handling of the material or other factors. In some examples, the formation step 30 may include granulating, dry blending, wet processing, compounding, or other similar or combinational technique for producing the blended material. In this regard, the blended material may be a granular material having particles of the electrically conductive material bound together with the resin binder or a mix of particles of the electrically conductive material and particles of the resin binder that are not attached to the electrically conductive material.

A few examples of the forming techniques will be described below. The starting materials used to produce the blended material may be selected to influence the properties of the blended materials, properties of the end-use porous article, or both. As an example, the electrically conductive material may be provided as particles with a particular size distribution. Natural or synthetic graphite particles may be used as the electrically conductive starting material. The graphite particles may have a size distribution such that 10 vol % of the particles are less than 12 micrometers in diameter, 50 vol % of the particles are less than 17 micrometers in diameter, and 90 vol % of the particles are less than 25 micrometers. This size distribution may be advantageous for water transport plates in fuel cells. Given this description, one of ordinary skill in the art will recognize other particle size distributions to meet their particular needs.

Additionally, the composition of the blended material may be varied depending on the end-use article. As an example, the composition may include 65-90 wt % of the electrically conductive material and a remainder of the thermosetting resin (e.g., 10-35 wt %).

In one exemplary granulating technique for forming the blended material, a known process is used to form agglomerates of the electrically conductive material attached with the resin binder. The agglomerates may initially be relatively large in size. In this regard, the granulation may include comminuting the agglomerates to form smaller agglomerates having a size distribution that is desired for uniform distribution within the molding cavity. As an example, the smaller agglomerates may be classified such that the blended material used in the molding process has an average diametric size within a range of 50-600 micrometers.

In some examples, additional resin binder may be added to the smaller agglomerates after comminuting the larger agglomerates to adjust a ratio or composition of the blended material. The ratio of the electrically conductive material to the resin binder may influence the final surface area of the molded porous article. For instance, if too much resin is initially used to form the agglomerates, the electrically conductive material may be embedded within the resin binder instead of attached to exterior surfaces of particles of the resin binder, which is a more desirable structure. Thus, by adding the resin after comminuting the larger agglomerates, a desired ratio of the resin binder to the electrically conductive material may be achieved without the drawback of embedding the electrically conductive material within particles of the resin binder.

The smaller agglomerates may be classified in any suitable manner, such as by screening the larger agglomerates. Other separation techniques may be used, such as cyclonic separation. In some examples, the comminuting used to break down the larger agglomerates may include any type of mechanical working to break down the larger size agglomerates, such as by grinding.

The dry blending technique may include formulating the blended material by mixing together, in a dry state, particles of the electrically conductive material and particles of the resin binder. Thus, an individual particle in the blended material is either composed of the electrically conductive material or the resin binder but there is no agglomeration of the materials. The dry mixture can then be distributed into the mold cavity as described above.

The wet processing technique of forming the blended material may include mixing particles of the electrically conductive material and particles of the resin binder together with a liquid carrier to form a slurry. As an example, the liquid carrier may be water or other suitable type of liquid. In some cases, the slurry may then be cast into a solid shape by drying to remove the liquid carrier or mechanical means. The solid shape may then be comminuted and optionally classified to form the blended material. In another example, the slurry may be dried under agitation conditions to directly form the blended material without the comminuting. For instance, the slurry can be dried in an agitated pan drier that heats the slurry and agitates it simultaneously to provide a granulation. Alternatively, the slurry may be sprayed through a nozzle into a dry stream of gas such that droplets of the slurry dry within the stream and are eventually collected using a collector. In this technique, the stream may also be used to separate granules by size or weight in combination with the drying process such that grinding or separation would not be required.

In one example compounding technique of forming the blended material, particles of the electrically conductive material and particles of the resin binder are heated, such as in an extruder, to mix the particles together to form one large agglomerate having the electrically conductive material attached with the resin binder. Smaller agglomerates may then be formed from the one larger agglomerate and then used as the blended material. For instance, the larger agglomerate may be cut or otherwise separated into smaller pieces or pellets upon exiting an extruder or comminuted in a known manner to provide a desirable size or size distribution of granules for distribution into the molding cavity.

Figure 2:
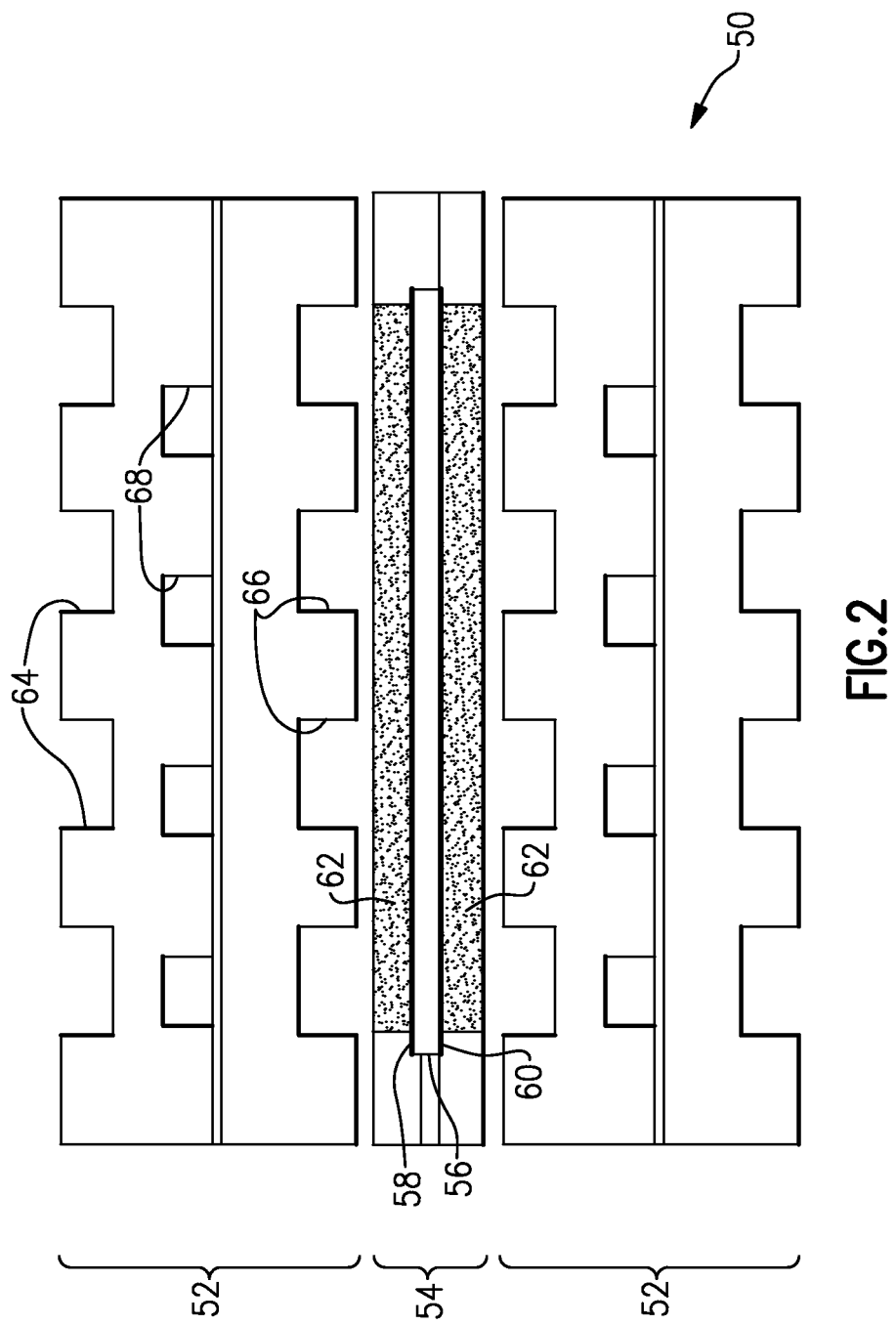
FIG. 2 illustrates an example fuel cell device having a porous water transport plate that may be processed according to the method illustrated in FIG. 1.

FIG. 2 illustrates selected portions of an example fuel cell device 50 for generating an electric current in a known electrode chemical reaction between reactant gasses. It is to be understood that disclose arrangement of the fuel cell 50 is only an example and that the concepts disclosed herein may be applied to the other fuel cell arrangements. In this example, the fuel cell device 50 includes water transport plates 52 that are processed according to the method 20 illustrated in FIG. 1. In this regard, the porous water transport plates 52 are porous articles that may be used within the fuel cell device 50 to distribute reactant gases, distribute moisture and liquid water, and provide electrical conductivity.

The example fuel cell device 50 includes an electrode assembly 14 and the porous water transport plates 52 for delivering reacting gases such as air and hydrogen to the electrode assembly 54. The electrode assembly 54 may include an electrolyte 56 between a cathode catalyst 58 and an anode catalyst 60. Gas diffusion layers 62 may be used between the water transport plate 52 and the electrode assembly 54 to facilitate distribution of the reacting gases. In this case, each of the porous water transport plates 52 includes first reacting gas flow field channels 64 on one side for delivering reacting gas to the anode 60 and second reactant gas flow field channels 66 on an opposite for delivering another reactant gas to a cathode 58. As illustrated, each of the porous water transport plates 52 also includes coolant channels 68 for facilitating maintaining a temperature of the fuel call device 50 and controlling moisture distribution within the fuel call device 50.

In the illustrated example, the porous water transport plates 52 have a porosity that is suitable to move liquid water through the plates 52. As an example, the porous water transport plates 52 may facilitate removing product water from the cathode 58 and humidifying the anode 60 to limit any drying. The porous water transport plates 52 may also serve other function within the fuel cell device 50, such as but not limited to wet sealing, heat exchange, current collection and the like. As an example, the method 20 may be used to tailor the pore size and size distribution of the pores within the porous water transport plate 52 to provide a desirable balance of liquid water permeability and bubble pressure. Bubble pressure is a physical characteristic that allows the porous water transport plate to serve as a gas separator. Capillary forces retain water within the porous structure until the gas to liquid pressure differential exceeds the bubble pressure. Bubble pressure is increased as the pore size of the water transport plate is decreased. Water permeability is required to remove liquid water from the cathode as explained, for example, in U.S. Pat. No. 5,503,944. Thus, using the disclosed method 20 to provide a desired pore size and pore size distribution provides the ability to tailor the balance between bubble pressure and water permeation.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of processing a porous article, the method comprising:
    distributing a blended material including an electrically conductive material and a binder into a cavity of a mold that is at a temperature below a curing temperature of the binder, where the electrically conductive material is formed from particles of the electrically conductive material that have a size distribution such that 10 vol % of the particles are less than 12 micrometers in diameter, 50 vol % of the particles are less than 27 micrometers in diameter, and 90 vol % of the particles are less than 53 micrometers;
    compressing the blended material within the cavity under a molding pressure;
    while the blended material is under compression in the cavity, heating the mold from a cool temperature to the curing temperature to thereby form a molded article; and
    carbonizing the binder of the molded article to form the porous article.

2. The method as recited in claim 1, further including carbonizing in an inert atmosphere.

3. The method as recited in claim 1, further including:
    forming the blended material to include agglomerates having the electrically conductive material attached with the binder.

4. The method as recited in claim 3, further including:
    comminuting the agglomerates to form smaller agglomerates.

5. The method as recited in claim 4, further including:
    classifying the smaller agglomerates such that the blended material includes an average diametric size within a range of 50-600 micrometers.

6. The method as recited in claim 4, further including:
    adding additional binder to the smaller agglomerates.

7. The method as recited in claim 1, wherein the particles of the electrically conductive material have a size distribution such that 10 vol % of the particles are less than 12 micrometers in diameter, 50 vol % of the particles are less than 17 micrometers in diameter, and 90 vol % of the particles are less than 25 micrometers.

8. The method as recited in claim 1, further including, prior to distributing the blended material:
    forming the blended material to include a dry mix of particles of the electrically conductive material and particles of the binder.

9. The method as recited in claim 1, further including, prior to distributing the blended material:
    wet mixing particles of the electrically conductively material and particles of the resin binder with a liquid carrier to form a slurry, casting the slurry into a solid shape, and comminuting the solid shape to form the blended material.

10. The method as recited in claim 1, further including, prior to distributing the blended material:
    heating particles of the electrically conductive material and particles of the binder, mixing the heated particles together to form an agglomerate of the electrically conductive material attached with the binder, and forming smaller agglomerates from the agglomerate as the blended material.

11. The method as recited in claim 1, further including, prior to distributing the blended material:
    wet mixing particles of the electrically conductive material and particles of the binder with a liquid carrier to form a slurry, and drying the slurry under agitation conditions to form the blended material.

12. The method as recited in claim 1, further including, prior to distributing the blended material:
    forming the blended material with a composition that includes 65-90 wt % of the electrically conductive material and a remainder of the binder.

13. The method as recited in claim 1, wherein the carbonizing includes heating the molded article in an inert atmosphere to thermally decompose the binder.

14. The method as recited in claim 1, further including:
    applying a hydrophilic material to the porous article.

15. The method as recited in claim 1, wherein distributing the blended material includes leveling a charge of the blended material in the cavity of the mold.

16. The method as recited in claim 1, wherein the blended material consists of the electrically conductive material and the binder.

17. The method as recited in claim 1, wherein the porous article is a porous water transport plate for a fuel cell.

18. The method as recited in claim 17, wherein the porous water transport plate has an average pore size of about 1-3 micrometers.

19. The method as recited in claim 1, wherein the compressing of the blended material within the cavity under the molding pressure includes:
    compressing under a first pressure of 0.5-100 pounds per square inch (3.5-689 kilopascals) at a first temperature of 10-50° C.; and
    followed by compressing under a second pressure of 400-800 pounds per square inch (2758-5516 kilopascals) as the mold is raised to a second temperature of 130-200° C.

* * * * *